United States Patent [19]

Wötting et al.

[11] Patent Number: 5,384,081
[45] Date of Patent: Jan. 24, 1995

[54] PROCESS FOR PRODUCTION OF SILICON NITRIDE MATERIAL

[75] Inventors: Gerhard Wötting, Coburg; Martin Knoch, Mitwitz; Klaus Kramer, Rödenthal, all of Germany

[73] Assignee: Bayer AG, Leverkusen, Germany

[21] Appl. No.: 125,787

[22] Filed: Sep. 24, 1993

[30] Foreign Application Priority Data

Oct. 6, 1992 [DE] Germany ............................ 4233602

[51] Int. Cl.⁶ ............................................. C04B 35/58
[52] U.S. Cl. ....................................... 264/65; 501/97; 501/98
[58] Field of Search ...................... 264/65; 501/97, 98

[56] References Cited

U.S. PATENT DOCUMENTS

| | | | |
|---|---|---|---|
| 3,950,464 | 4/1976 | Masaki | 264/65 |
| 4,280,850 | 7/1981 | Smith | 501/97 |
| 4,354,990 | 10/1982 | Martinengo et al. | 264/65 |
| 4,517,168 | 5/1985 | Kawahito | 501/97 |
| 5,017,530 | 5/1991 | Arakawa et al. | 501/98 |
| 5,248,490 | 9/1993 | Krause | 423/344 |

FOREIGN PATENT DOCUMENTS 3141590  6/1982  Germany ............................ 264/66

*Primary Examiner*—James Derrington
*Attorney, Agent, or Firm*—Connolly and Hutz

[57] ABSTRACT

The present invention relates to a process for the production of a dense $Si_3N_4$ material by normal pressure sintering of mouldings which have been manufactured from mixtures of $Si_3N_4$ powders and sintering additives without being embedded in a powder packing and are sintered at temperatures of $1775°\ C\pm75°\ C$.

12 Claims, No Drawings

PROCESS FOR PRODUCTION OF SILICON NITRIDE MATERIAL

The present invention relates to a process for the production of a dense $Si_3N_4$ material by normal pressure sintering of mouldings which have been manufactured from mixtures of $Si_3N_4$ powder and sintering additives without being embedded in a powder packing and are sintered at temperatures of 1775° C.±75° C.

Dense silicon nitride materials are gaining increasingly in importance for use in the construction of machinery, turbines and engines, the construction of chemical apparatus and metal working by virtue of their combination of advantageous material properties such as high strength up to high temperatures, low coefficient of thermal expansion, great hardness and fracture toughness, advantageous elastic characteristics and consequent high resistance to thermal shock and a high resistance to corrosion by many chemicals and metal melts, abrasion resistance and oxidation resistance up to high temperatures. One factor, however, that has repeatedly stood against their wider use is the comparatively high cost of these materials and of the structural parts produced from them, which is due mainly to the complex processing which has hitherto been necessary and the limitation in capacity of the apparatus and equipment used.

Dense $Si_3N_4$ materials and structural parts capable of withstanding high stresses are produced by disagalomerating and homogenizing $Si_3N_4$ powders by intensive grinding together with the sintering additives required for compacting them. After the materials have been shaped by one of the conventional processes employed for ceramics, the products are sintered with a view to eliminating the porosity as far as possible and obtaining an optimum profile of properties of the material or structural part.

This sintering may be carried out by various processes, the simplest being the so-called pressure-free sintering under a nitrogen gas pressure of about 1 bar (normal pressure sintering). In this process, the material or structural part is heated to temperatures of at most 1820° C. in suitable protective gas furnaces and maintained at this temperature for a sufficient length of time. Temperatures substantially higher than 1820° C. should be avoided as they give rise to marked decomposition of the $Si_3N_4$ into free Si and gaseous $N_2$ accompanied by damage to the material or structural part and weight loss. According to US-A 5 017 530, this damage is prevented as far as possible by completely embedding the material or structural part in a protective powder, usually consisting of $Si_3N_4$±sintering additives, in a container of BN, C, SiC or AlN. This promotes the development of an "individual atmosphere" round the part and the reactions of evaporation and decomposition are suppressed or at least attenuated.

In order to obtain a dense silicon nitride by the process of normal pressure sintering, it is necessary to add a comparatively large amount of sintering additives which lead to the formation of a liquid phase with low eutectic temperature and low viscosity at the sintering temperature. Many sintering additives proposed for this purpose in GB-A 2 010 913 have, however, comparatively high vapour pressures at elevated temperatures, with the result that these substances tend to volatilize, especially from regions near the surface of the material to be sintered. This results in gradients of composition and properties and in some cases incomplete compacting, which is unacceptable for parts which are to be subjected to severe conditions. One measure for preventing these phenomena is the above-described embedding in a protective powder of $Si_3N_4$±sintering additives inside a BN, C, SiC or AlN container to produce an "individual atmosphere" round the parts to be sintered and suppress the evaporation of additive.

This process of normal pressure sintering in packings of protective powder has, however, the serious disadvantage of being limited in its possibility of technical development. This is due to the fact that the bed of powder severely retards the equalization of temperature between the outer and inner regions of the powder packing.

This results in differences between the effective temperature/time profiles of samples situated near the outside or the centre of the packing, so that the samples differ from one another in their properties and in extreme cases compacting is incomplete. This is unacceptable for the manufacture of parts on a large scale. It will also be obvious that these problems increase exponentially with increasing size of the packing ($\geq 15$ cm $\phi$), hence the limited scope for technical expansion.

Alternatives to normal pressure sintering are gas pressure sintering and uncapsulated hot isostatic pressing (HIPing) in which decomposition of $Si_3N_4$ is suppressed by the increased $N_2$ pressure so that higher sintering temperatures become possible. The increased $N_2$ pressure has, however, little or no effect on the evaporation of additive and on the disproportionation reaction whereby $SiO_2$, which is always present in $Si_3N_4$ powders and an essential reactant for liquid phase sintering, is converted into volatile SiO. On the contrary, these procedures are promoted by the elevated temperatures so that in effect the same difficulties result as in pressure-free sintering, in particular the formation of composition and property gradients, especially in the regions of samples close to the surface. The usual method of avoiding these problems is again the embedding of samples in a protective powder, but in relatively large arrangements this leads to exactly the same problems of retarded temperature equalization and hence the development of property differences between different structural parts as has been described for normal pressure sintering. Further, both gas pressure sintering installations and HIP installations are complex, expensive apparatus whose useful volume cannot be increased to any amount desired,so that no reduction in cost can be achieved by manufacturing large numbers of pieces.

It is therefore an object of the present invention to provide an economical process for the production of $Si_3N_4$ materials and improved materials which do not have the disadvantages of the state of the art described above.

It should be possible under the conditions of pressure-free or normal pressure sintering to convert suitable $Si_3N_4$ material compositions to highly compacted structural parts having properties specifically adapted to the intended uses.

It has now surprisingly been found that these requirements are fulfilled by a process for the preparation of a dense $Si_3N_4$ material by normal pressure sintering (1 bar $N_2$) of mouldings which have been produced from mixtures of $Si_3N_4$ powders and additives without the procedure of embedding in a powder mixture and are sintered at temperatures of 1775°±75° C., using sintering additives consisting of a mixture or mixed oxide compounds of MgO, Al$_2$O$_3$ and Y$_2$O$_3$ in quantities of $\geq 7.5\%$ by weight, based on the total powder mixture. This process is a subject matter of the present invention.

In contrast to processes according to the known state of the art, substantially higher sintering densities combined with reduced weight loss can be achieved with compacts of powder compositions according to the invention without embedding it in a powder mixture.

Especially good results are obtained if the mixture of sintering additives contains proportions by weight of MgO of from 9 to 40%, Al$_2$O$_3$ of from 10 to 50% and Y$_2$O$_3$ of from 30 to 70%.

The ratio by weight of the sintering additives MgO, Al$_2$O$_3$ and Y$_2$O$_3$ thus provide a relatively wide scope for variation. The sintering conditions must be suitably adapted to the particular composition and in particular the sintering characteristics of the Si$_3$N$_4$ powder used in order to reach the values according to the invention, which are characterised by a sintering density amounting to $\geq 95\%$ of the theoretical density and a weight loss during sintering of $\leq 5\%$ by weight.

It is advantageously possible in the process according to the invention to replace the comparatively expensive, high quality Y$_2$O$_3$ by less expensive sintering alternatives. Thus in a preferred embodiment of the process according to the invention, Y$_2$O$_3$ is replaced weight for weight by rare earth oxides such as La$_2$O$_3$ and/or CeO$_2$ or by a rare earth oxide precursor consisting substantially of one or more oxides of the group comprising Y$_2$O$_3$ and rare earth oxides such as La$_2$O$_3$, CeO$_2$, Nd$_2$O$_3$, etc. Such rare earth oxide precursors are powders available on the market, consisting of Y$_2$O$_3$ and various rare earth oxides, being distinguished by their great purity.

It must be regarded as surprising in this context that the replacement materials for Y$_2$O$_3$ can readily be used without departing from the range of sintering and mechanical properties according to the invention.

Another important factor influencing the compacting of Si$_3$N$_4$ samples by normal pressure sintering without embedding in a powder packing lies in the properties of the Si$_3$N$_4$ powder used and the characteristics of the prepared sintering mixture.

Thus if the specific surface area (BET-N$_2$-one point method according to DIN 66 131) of the powder mixture is less than about 10 m$^2$/g and the oxygen content of the Si$_3$N$_4$ powder, not counting the oxygen content of the additives ("O without O-adds"), is below 1.2% by weight, it is no longer possible to obtain a theoretical density of—$\geq 95\%$ and a weight loss of $\leq 5\%$ by weight under the specific conditions of the process. Carbon contents of $\geq 0.5\%$ by weight are also found to be unsuitable for reaching these figures.

Powder mixtures having a specific surface area of $\geq 10$ m$^2$/g, oxygen contents, based on the Si$_3$N$_4$ content, of $\geq 1.2\%$ by weight, carbon contents of $\leq 0.5\%$ by weight and metallic impurities of $\leq 2000$ ppm are thus to be regarded as preferred for the process according to the invention.

In order to obtain further increases in the sintering density combined with reduction of the weight losses and good homogeneity of the materials, it may be advantageous for the process according to the invention to carry out sintering inside closed but not gas-tightly sealed containers of graphite or carbon coated with BN powder or a mixture of BN powder and the sintering powder mixture in quantities of up to 90% by weight and optionally covered in addition with a thin bottom layer of this powder or mixture.

It was found that sintering was significantly inhibited in untreated carbon crucibles compared with coated graphite crucibles. The coating according to the invention and introduction of the additional powder layer is capable, however, of improving the local conditions to such an extent that sintering results comparable to those obtained in high quality graphite crucibles can be achieved.

It must be regarded as a particularly positive feature that both when coated graphite crucibles are used and when coated carbon crucibles are used, in both cases with the powder layer at the bottom of the crucible, the thickness of the surface inhomogeneities of the material, i.e. the surface zones of the sintered samples, can be reduced to negligible amounts of $<50$ μm.

In addition, a striking increase in the sintering density combined with a marked increase in the flexural strength (mean values) can be obtained by increasing the holding time in the process according to the invention. Thus an Si$_3$N$_4$ material having a density amounting to at least 95% of the theoretical density combined with a flexural strength of at least 750 MPa and a Weibull modulus of at least 10 can be obtained in the process according to the invention by normal pressure sintering at 1800° C. and a minimum holding time of 90 min without embedding of the samples in a powder packing.

This invention thus relates to an Si$_3$N$_4$ material obtainable by the process according to the invention, having a sintering density amounting to $\geq 95\%$ of the theoretical density, a flexural strength at room temperature of $\geq 750$ MPa and a Weibull modulus of $\geq 10$.

Due to the good mechanical properties and the reliability of the materials according to the invention and the possibility of producing them in large batches, structural parts produced from these materials are eminently suitable for use in the construction of motor vehicles, especially for the manufacture of valve train components and in particular for valves in combustion engines, and for bearings, e.g. for roller bearing rings and balls and for numerous applications for reducing friction and wear.

This invention thus also relates to the use of the Si$_3$N$_4$ material according to the invention as structural part for the construction of motor vehicles, preferably for the construction of valve train components and in particular valves of internal combustion engines, and for bearings, e.g. for roller bearing rings and bails.

The invention is described below with the aid of examples which are not to be regarded as limiting the invention.

Examples

To investigate normal pressure sintering of Si$_3$N$_4$ without embedding in a powder packing, various state of the art mixtures of sintering active Si$_3$N$_4$ powders and sintering additives and concentrations were used to carry out sintering tests in a graphite resistance heated sintering apparatus of large volume (30 litres). For purposes of comparison, the samples were sintered with and without powder packing in a graphite crucible ($\phi = 180$ mm) with loosely fitting lid. The powder packing used was in each case a mixture of 70% of sintering preparation (i.e. the preparation of Si$_3$N$_4$ powder with suitable sintering additives also used for the preparation of the samples) +30% of BN powder (HCST A01 - Trade Product of H. C. Starck).

The Si$_3$N$_4$ powder used was one known to be of sintering active quality, characterised by a specific surface area of 12 m$^2$/g (determined by the N$_2$-one point method DIN 66131), an oxygen content of 1.6% by weight, a carbon content of <0.1% by weight and metallic impurities amounting to <150 ppm in the starting material. The sintering cycle employed consisted of a ramp with constant heating rate of 10 K/min to the predetermined maximum temperature and a holding time at this temperature of 1 h, all under a constant pressure of 1 bar N$_2$, followed by cooling at the rate of 10 K/min up to the time when the cooling rate was determined by the maximum possible furnace cooling.

The results of the sintering mixtures A first tested, containing 7.5% by weight of MgAl$_2$O$_4$ and B containing 5% by weight of Y$_2$O$_3$+5% by weight of Al$_2$O$_3$ are summarized in Table 1, in which the sintering density was based on the theoretical density (TD in %) of the given composition, calculated according to the equation:

$$p - th = G - ges/\sum_{i=1}^{i=n}(G_i \& p_i), \text{g/cm}^3; TD = (-s/p - th) \cdot 100\%$$

p-th = theoretical density of the mixture in g/cm$^3$
G-ges = total weight of the mixture in g
G$_i$ = weight of the individual components of the mixture in g
p$_i$ = density of the individual components of the mixture in g/cm$^3$
p -s = sintering density of the material in g/cm$^3$
TD = percentage density of the material, based on the theoretical density p -th samples situated in the outer regions of the crucible; this confirms the above-described problems of achieving uniform material properties when a relatively large number of parts is sintered simultaneously. This problem is to a large extent solved in the process according to the invention, as may be seen from the results of sinterings carried out without a powder packing (Table 1).

The results recorded show, however, that the selected compositions A and B cannot be completely compacted by normal pressure sintering without powder packing. At 1700° C. (Sintering 1 ), the samples from mixture A already have a relatively high sintering density but this decreases with increasing temperature due to excessive weight losses. Samples from this sintering were found to have pale surface layers which burst away, indicating massive evaporation of additive. By comparison, mixture B becomes compacted with some delay but the density value obtained at 1825° C. does not lead one to expect complete compacting by an increase in the holding time and/or by further increase in the temperature with avoidance of still greater weight losses.

Mixture C was chosen to have the combination of 5% by weight Y$_2$O$_3$+7.5% by weight MgAl$_2$O$_4$. The test conditions were identical to those of mixtures A and B and the result is included in Table 1.

As Table 1 shows, mixture C according to the invention can be sintered to a substantially higher sintering density under a pressure of 1 bar N$_2$ (normal pressure sintering) without being embedded in a powder packing and at the same time the weight loss is reduced compared with that of mixture A.

The sintering arrangement described in Table 2 was

TABLE 1

Influence of the sintering additives and the sintering conditions on the sintering density (p-TD) and the change in weight (dG) of the samples

| | Sintering 1: 1700° C./1 h | | Sintering 2: 1800° C./1 h | | Sintering 3: 1825° C./1 h | |
|---|---|---|---|---|---|---|
| | p-TD [%] | dG [% by wt] | p-TD [%] | dG [% by wt] | p-TD [%] | dG [% by wt] |
| With powder packing | Sintering mixture A: 7.5% by weight MgAl$_2$O$_4$ (Comparison) | | | | | |
| central in crucible | 82 | −1.8 | 91 | −2.7 | 94 | −3.6 |
| decentral in crucible | 78 | −1.4 | 88 | −2.1 | 90 | −2.9 |
| Without powder packing | | | | | | |
| Outside of sample | 84 | −2.5 | 82 | −7 | decomposed | |
| Inside of sample | 84 | −2.4 | 82 | −6.8 | decomposed | |
| With powder packing | Sintering mixture B: 5% by wt Y$_2$O$_3$ + 5% by weight Al$_2$O$_3$ (Comparison) | | | | | |
| Outside of sample | 77 | −0.8 | 82 | −1.8 | 85 | −2.6 |
| Inside of sample | 74 | −0.6 | 78 | −1.5 | 81 | −1.8 |
| Without powder packing | | | | | | |
| Outside of sample | 80 | −1.2 | 85 | −3.5 | 88 | −5.3 |
| Inside of sample | 79 | −1 | 85 | −3.3 | 87 | −5.1 |
| | Sintering mixture C: 5% by wt Y$_2$O$_3$ + 7.5% by wt. MgAl$_2$O$_3$ | | | | | |
| With powder packing (inside) | 80 | −1 | 85 | −1.9 | 92 | −3.2 |
| Without power packing | 85 | −1.3 | 88 | −4.2 | 89 | −8.2 |

Table 1 shows that when normal pressure sintering is carried out in a powder packing, sintering mixture A is closer to having the potential of complete compacting than sintering mixture B. A striking feature is the delayed sintering of samples situated in the centre of the crucible inside the powder packing compared with modified. The crucible was covered with a coating.

This means that a water based viscous slip having a solids content of about 50% was prepared from the given material with the addition of about 3% of long chain polyvinyl alcohol simply by stirring and the internal surfaces of the crucible were coated with a thin layer (about 0.5 mm). Before this crucible was put into use, it was pretreated by an annealing treatment, e.g. such as sintering 1 (Table 1 ). The term "powder layer" in Table 2 means that a loosely packed layer about 1 to 2 cm in thickness of the given powder was applied to the bottom of the crucible without the powder either touching or enveloping the samples. The mixing ratio of BN/mixture C in this example was 50/50 by weight.

Results of these measures determined on samples of mixture C are summarized in Table 2, which shows that measures 1 to 5, taken in this sequence, always produce a certain increase in the sintering density and reduction in the weight losses and in the thickness of the surface zones ing containers would be an advantage from a cost point of view. The sintering results of the direct comparison of arrangements 5, 6 and 7 are also shown in Table 2. The thickness of the surface zones was measured on slides under an optical microscope.

The influence of the holding time at maximum temperature of sintering cycle 2 on the sintering density and on the mechanical properties of the sintered material was also examined. For this purpose, the holding time of sintering 2 in sintering arrangement 5 (Table 2) was increased from 1 hour to 4 hours in stages of one hour and the flexural strength (4-point, 40/20 mm, dimensions of test samples 3.0×4.0×45 mm) was determined. Mixture C was again used. Results are summarized in Table 3.

TABLE 3

Influence of the holding time at 1800° C. on the sintering density, the change in weight and the flexural strength including the Weibull modulus of samples of mixture C; (sintering arrangement 5/Table 2)

| Sintering conditions | Sintering density $\rho$-TD [%] | Weight change dG [% by wt.] | RT Flexural strength $\delta$-RT [MPa] | Weibull modulus m |
| --- | --- | --- | --- | --- |
| 1800° C./1 h | 93.5 | −2.4 | 650 | 12 |
| 1800° C./2 h | 96.2 | −2.8 | 760 | 11 |
| 1800° C./3 h | 97.8 | −2.9 | 825 | 16 |
| 1800° C./4 h | 98.2 | −3.1 | 805 | 11 |

TABLE 2

Influence of the sintering arrangement on the sintering density ($\rho$-TD), the weight change (dG) and the surface zone thickness of samples of mixture C under sintering conditions corresponding to Sintering 2 (see Table 1)

| Arrangement | Crucible material | Crucible Coating | Powder layer at bottom of crucible | Sintering results Sintering 2: 1800° C./1 h $\rho$-TD (%) | dG (% by wt.) | Thickness of Surface zone ($\mu$m) |
| --- | --- | --- | --- | --- | --- | --- |
| 1 | graphite | — | — | 91 | −3.2 | 600 |
| 2 | graphite | BN | — | 91.5 | −3 | 250 |
| 3 | graphite | BN | BN | 91.6 | −2.9 | 200 |
| 4 | graphite | BN + mixt. C | — | 92.1 | −2.7 | 70 |
| 5 | graphite | BN + mixt. C | BN + mixt. C | 93.5 | −2.4 | <50 |
| 6 | carbon | BN + mixt. C | BN + mixt. C | 82 | −4.7 | 800 |
| 7 | carbon | BN + mixt. C | BN + mixt. C | 90.8 | −3.5 | <50 |

The influence of the crucible material was also investigated. This is of interest in that high quality graphite crucibles of large volume are expensive and only available in limited sizes whereas porous carbon containers of inferior quality can be produced inexpensively in almost any sizes and shapes. Their suitability as sintering containers would be an advantage from a cost point of view.

The possibilities of varying the sintering additive combination used, both in relation to the individual components and the overall concentration, were investigated without going below the minimum values of properties of the sintered materials specified above. The variations carried out using sintering arrangement 5 (Table 2) and the results obtained are summarized in Table 4.

TABLE 4

Influence of the concentration of MgO—Al$_2$O$_3$—Y$_2$O$_3$ and of the concentration ratio on the sintering behaviour and on the resulting mechanical properties

| Starting mixture | Total concentration of additives [% by wt] | Ratio by weight of additives MgO | Al$_2$O$_3$ [%] | Y$_2$O$_3$ | Sintering conditions T-max [°C.] | t at T-max [h] | Sintering density $\rho$-TD [%] | Weight change dG [% by wt.] | RT Flexural strength t [MPa] | Weibull modulus | according to the invention? |
| --- | --- | --- | --- | --- | --- | --- | --- | --- | --- | --- | --- |
| E | 12.5 | 16.8 | 43.2 | 40 | 1800 | 3 | 97.8 | −2.8 | 825 | 16 | yes |
| D | 10 | 16.8 | 43.2 | 40 | 1820 | 2 | 97.2 | −3.4 | 810 | 13 | yes |
| C | 7.5 | 16.8 | 43.2 | 40 | 1820 | 3 | 97 | −3.6 | 790 | 11 | yes |
| F | 5 | 16.8 | 43.2 | 40 | 1820 | 4 | 87 | −5.7 | — | — | no |
| G | 10 | 14 | 36 | 50 | 1820 | 2 | 96.8 | −3.1 | 810 | 12 | yes |
| H | 7.5 | 9.3 | 24 | 66.7 | 1820 | 3 | 95.2 | −3.7 | 780 | 11 | yes |
| I | 6 | 5 | 11.7 | 83.3 | 1820 | 4 | 84.2 | −5.8 | — | — | no |
| J | 10 | 20 | 50 | 30 | 1800 | 3 | 97.5 | −3.7 | 820 | 14 | yes |
| K | 7.5 | 24 | 62.7 | 13.3 | 1820 | 2 | 92.3 | −5.3 | 665 | 12 | no |
| L | 10 | 30 | 20 | 50 | 1820 | 2 | 97.8 | −3.8 | 830 | 11 | yes |
| M | 10 | 40 | 10 | 50 | 1820 | 2 | 95.4 | −4.8 | 770 | 12 | yes |
| N | 10 | 50 | — | 50 | 1800 | 2 | 93.2 | −6.2 | — | — | no |

TABLE 4-continued

Influence of the concentration of MgO—$Al_2O_3$—$Y_2O_3$ and of the concentration ratio on the sintering behaviour and on the resulting mechanical properties

| Starting mixture | Total concentration of additives [% by wt] | Ratio by weight of additives [%] | | | Sintering conditions | | Sintering density ρ-TD [%] | Weight change dG [% by wt.] | RT Flexural strength t [MPa] | Weibull modulus | according to the invention? |
|---|---|---|---|---|---|---|---|---|---|---|---|
| | | MgO | $Al_2O_3$ | $Y_2O_3$ | T-max [°C.] | t at T-max [h] | | | | | |
| O | 10 | 5 | 45 | 50 | 1820 | 4 | 94.4 | −5.2 | 740 | — | no |

The influence of the rare earth oxide used and of the MgO-$Al_2O_3$-R.E. oxide concentration on the sintering behaviour of the $Si_3N_4$ material was also investigated. Various inexpensive rare earth oxides were used for this purpose, such as $La_2O_3$ and $CeO_2$ as well as very inexpensive R.E. oxide precursors available on the market (SEO VP) containing $Y_2O_3$ and various R.E. oxides, distinguished by great fineness. The sintering results and the mechanical properties obtained when these products were used instead of pure $Y_2O_3$ are summarized in Table 5.

TABLE 5

Influence of the nature of the R.E. oxide used and of the MgO $Al_2O_3$-R.E. oxide concentration on the sintering behaviour and on the resulting mechanical properties

| Starting mixture | Total concentration of additives [% by wt] | Ratio by weight of additives | | | Sintering conditions | | Sintering density ρ-TD [%] | Weight change dG [% by wt] | RT flexural strength δ-RT [MPa] | Weibull modulus m | according to the invention |
|---|---|---|---|---|---|---|---|---|---|---|---|
| | | MgO | $Al_2O_3$ | R.E. oxide | T-max [°C.] | t at T-max [h] | | | | | |
| P | 10 | 16.8 | 43.2 | 40 (La2O3) | 1820 | 3 | 97.6 | 3.7 | 830 | 14 | yes |
| Q | 10 | 16.8 | 43.2 | 40 (CeO2) | 1820 | 2 | 97.5 | 3.4 | 810 | 15 | yes |
| R1 | 10 | 16.8 | 43.2 | 40 (SEO-VP1) | 1820 | 2 | 98.2 | 4.2 | 845 | 13 | yes |
| R2 | 7.5 | 16.8 | 43.2 | 40 (SEO-VP1) | 1820 | 3 | 97,8 | 4.4 | 785 | 11 | yes |
| S | 10 | 10 | 20 | 70 (SEO-VP2) | 1750 | 4 | 97.2 | 4.8 | 765 | 11 | yes |

SEO-VP1 (wt. %): ca. 80 $Y_2O_3$, 15 $La_2O_3$, residual = further Rare Earth Oxides
SEO-VP2 (wt. %): ca. 45 $Nd_2O_3$, 12 $Pr_6O_{11}$, 8 $La_2O_3$, 3 $CeO_2$, residual = $Y_2O_3$ and further Rare Earth Oxides The various $Si_3N_4$ powders shown in Table 6 were compared, using as criteria of evaluation the characteristics of the powders or starting mixtures after their preparation. Preparation of the powder mixtures was in all cases carried out by 5 hours grinding in a centrifugal ball mill at 1000 revs/min with $Si_3N_4$ grinding beads 5 mm in diamater in isopropanol, using a solids:ball:liquid ratio of 1:3:3.

TABLE 6

Influence of the characteristics of the $Si_3N_4$ powder or sintering mixture on the sintering density, the weight change and the flexural strength including the Weibull modulus: starting mixture C, sintering arrangement 5/Table 2

| Starting Mixture: | Characteristics of the sintering mixture | | | | | Sintering conditions | | Sintering density ρ-TD [%] | Weight change dG [% by wt.] | RT Flexural strength δ-RT [MPa] | Weibull modulus m | According to the invention |
|---|---|---|---|---|---|---|---|---|---|---|---|---|
| | BET [m²/g] | Total O [% by wt.] | O without O of additives [% by wt.] | C [% by wt.] | Me Im purities [ppm] | T-max [°C.] | t at T-max [h] | | | | | |
| C | 12 | 5 | 1.7 | 0.1 | 150 | 1800 | 2 | 96.2 | −2.8 | 760 | 11 | yes |
| T | 7 | 5.5 | 2.3 | 0.3 | 2500 | 1810 | 4 | 92 | −5.7 | — | — | no |
| U | 11 | 4.6 | 1.3 | 0.1 | 200 | 1810 | 4 | 90.8 | −4.6 | — | — | no |
| V | 11.5 | 5.4 | 2.2 | 0.8 | 2300 | 1810 | 4 | 91.4 | −4.3 | — | — | no |
| W | 22 | 5.4 | 2.2 | 0.2 | 1100 | 1800 | 2 | 97.6 | −3.8 | 820 | 14 | yes |

What is claimed is:

1. A process for the preparation of a dense $Si_3N_4$ material by normal pressure (1 bar) sintering in nitrogen of mouldings which have been produced from mixtures of $Si_3N_4$ powder and sintering additives without being embedded in a powder packing and are sintered at temperatures of 1775°±75° C., wherein the sintering additives used are a mixture or a mixed oxide compound of MgO, $Al_2O_3$ and one or more oxides of the group comprising $Y_2O_3$ and rare earth oxides in a quantity of $\geq 7.5\%$ by weight, based on the total powder mixture, further wherein the specific surface area of the total powder mixture is $\geq 12$ m²/g, the oxygen content of the $Si_3N_4$ powder in the mixture amounts to $\geq 1.2\%$ by weight, the carbon content of the mixture is $\leq 0.5\%$ by weight and the other metallic impurities, excluding the sintering additives, amount to $\leq 0.2\%$ by weight.

2. A process according to claim 1, wherein the proportions by weight in the mixture of sintering additives are from 9 to 40% of MgO, from 10 to 50% of $Al_2O_3$ and from 30 to 70% of one or more oxides of the group comprising $Y_2O_3$ and rare earth oxides.

3. A process according to claim 2, wherein $Y_2O_3$ is replaced weight for weight by at least one rare earth oxide.

4. A process according to claim 2, wherein $Y_2O_3$ and/or the rare earth oxide is replaced weight for weight by a rare earth oxide precursor consisting essentially of one or more oxides selected from the group consisting of $Y_2O_3$ and rare earth oxides.

5. A process according to clairol, wherein the sintering is carried out inside closed but not gas-tightly sealed containers of graphite or carbon wherein at least the interior surfaces of the containers are coated with BN powder or a mixture of BN powder and up to 90% by weight of the mixture of $Si_3N_4$ powder and sintering additives.

6. A process according to claim 5, wherein the interior bottom surface of the containers is also covered with a thin layer of BN powder or a mixture of BN powder and up to 90% by weight of the mixture of $Si_3N_4$ powder and sintering additives.

7. The process according to claim 4, wherein the rare earth oxides are selected from the group consisting of $La_2O_3$, $CeO_2$ and $Nd_2O_3$.

8. The process according to claim 1, wherein the dense $Si_3N_4$ material has a sintering density amounting to $\geq 95\%$ of the theoretical density of $Si_3N_4$, a flexural strength at room temperature of $\geq 750$ MPa and a Weibull modulus of $\geq 10$.

9. The process according to claim 1, wherein the dense $Si_3N_4$ material has a sintering density amounting to $\geq 96\%$ of the theoretical density of $Si_3N_4$, a flexural strength at room temperature of $\geq 760$ MPa and a Weibull modulus of $\geq 11$.

10. The process according to claim 1, wherein the dense $Si_3N_4$ material has a sintering density amounting to $\geq 98\%$ of the theoretical density of $Si_3N_4$, a flexural strength at room temperature of $\geq 805$ MPa and a Weibull modulus of $\geq 11$.

11. The process according to claim 1, wherein the dense $Si_3N_4$ material has a sintering density amounting to $\geq 98\%$ of the theoretical density of $Si_3N_4$, a flexural strength at room temperature of $\geq 825$ MPa and a Weibull modulus of $\geq 16$.

12. The process according to claim 1, wherein the dense $Si_3N_4$ material has a sintering density of about 96.2–98.2% of the theoretical density of $Si_3N_4$, a flexural strength at room temperature of about 760–845 MPa and a Weibull modulus of about 11–16.

* * * * *